United States Patent Office 2,713,559
Patented July 19, 1955

2,713,559

PROCESS FOR BREAKING PETROLEUM EMULSIONS

Alvin Howard Smith, Kirkwood, Mo., assignor to Petrolite Corporation, a corporation of Delaware No Drawing. Application April 10, 1952,
Serial No. 281,645

14 Claims. (Cl. 252—341)

This invention relates to processes or procedures particularly adapted for preventing, breaking or resolving emulsions of the water-in-oil type, and particularly petroleum emulsions.

Complementary to the above aspects of my invention is my companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See my co-pending application, Serial No. 281,646, filed April 10, 1952.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present invention in one of its more important aspects is concerned with the resolution of water-in-oil emulsions by means of certain fractional esters hereinafter described in detail.

In practicing the process of the present invention one may employ compounds derived from either polyamines in which the nitrogen atoms are separated by an ethylene radical or by a propylene radical or by a trimethylene radical. Reference to a propylene radical means a methyl substituted ethylene radical, i. e., having only 2 carbon atoms between nitrogen atoms. From a practical standpoint as will be explained hereinafter, the polyethylene imidazolines are most readily available and most economical for use. Thus, broadly speaking, the present invention is concerned with a process for breaking petroleum emulsions of the water-in-oil type characterized by subjecting the emulsion to the action of a demulsifier including synthetic hydrophile products; said synthetic hydrophile products being obtained by reaction between (A) a polycarboxy acid, and (B) a highly oxypropylated substituted ring compound consisting of

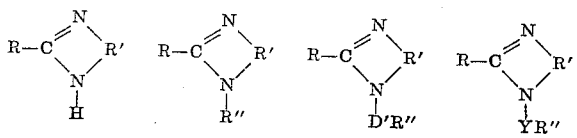

in which R' is a divalent alkylene radical selected from the class consisting of $$-CH_2CH_2-$$
$$-CH_2CH_2CH_2-$$

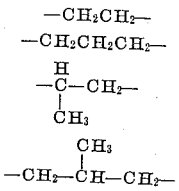

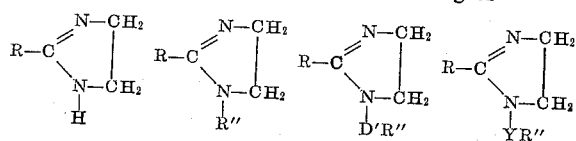

and in which D' represents a divalent, non-amino, organic radical containing less than 25 carbon atoms, composed of elements from the group consisting of C, H, O, and N; Y represents a divalent, organic radical containing less than 25 carbon atoms, composed of elements from the group consisting of C, H, O, and N, and containing at least one amino group, and R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrence of the radicals R and R" there be present at least one group of 8 to 32 uninterrupted carbon atoms; and with the further proviso that (1) there be introduced at least 12 moles of propylene oxide per substituted nitrogen-containing ring compound, and that (2) there be employed at least one mole of the polycarboxy reactant for each reactive hydroxyl radical.

More specifically, and in a more limited scope, the present invention is concerned with a process for breaking petroleum emulsions of the water-in-oil type characterized by subjecting the emulsion to the action of a demulsifier including hydrophile synthetic products; said hydrophile synthetic products being obtained by reaction between (A) a polycarboxy acid, and (B) a highly oxypropylated substituted imidazoline consisting of

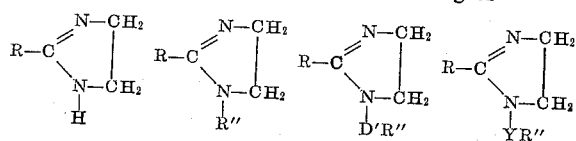

in which D' represents a divalent, non-amino, organic radical containing less than 25 carbon atoms, composed of elements from the group consisting of C, H, O, and N; Y represents a divalent, organic radical containing less than 25 carbon atoms, composed of elements from the group consisting of C, H, O, and N, and containing at least one amino group, and R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrence of the radicals R and R" there be present at least one group of 8 to 32 uninterrupted carbon atoms; and with the further proviso that (1) there be introduced at least 12 moles of propylene oxide per substituted nitrogen-containing ring compound, and that (2) there be employed at least one mole of the polycarboxy reactant for each reactive hydroxyl radical.

Generally speaking, as explained hereinafter, almost invariably there will be employed one mole of polycarboxy reactant for each hydroxyl radical. More can be used by virtue of an amidification reaction. In some instances, however, one can use modestly less than one mole of the polycarboxy reactant for each reactive hydroxyl radical without in any way changing the nature of the instant invention, provided only there is no difficulty from cross-linking, gelation, formation of rubberlike compounds, etc. In other words, if gels are formed the amount of polycarboxy reactant should be increased. If no gel is formed a somewhat reduced amount can be employed, provided that rubberlike character does not enter.

As pointed out elsewhere, R in the preceding formulas, when derived from a hydroxy fatty acid, such as ricinoleic acid, actually contains the element oxygen in addition to the hydrocarbon group without detracting from the hydrophobe character transmitted by the hydrocarbon group and yet makes the radical susceptible to oxyproplylation.

These materials can be obtained in any suitable manner. They can either be purchased in the open market or the substituted imidazolines can be prepared as described in U. S. Patent Re. 23,227, dated May 9, 1950, to Blair and Gross. The most readily available sources of polyamines are polyethylene polyamines having from 2 to 7 or 8 nitrogen atoms. The most readily available source of the hydrocarbon radical which becomes substituted in imidazoline ring is a detergent-forming monocarboxy acid having approximately 8 to 32 carbon atoms as exemplified by fatty acids, resin acids such as abietic acid, naphthenic acid, or the like. Such detergent-forming monocarboxy acids have been described in the literature and are characteristic of the fact that they combine with the water-soluble base, such as caustic soda, caustic potash, or ammonia, to give detergent or detergent-like compounds. The most suitable alkalene oxide to use is propylene oxide. Indeed, for all practical purposes, the derivatives obtained from propylene oxide are so markedly superior to other alkylene oxides, for instance, even nearby oxides such as ethylene oxide and the various butylene oxides, that such other oxides can be ignored in this invention and it be considered as limited specifically to propylene oxide. As pointed out elsewhere, without detracting from the spirit of the invention one could employ a small percentage of ethylene oxide or butylene oxide along with the propylene oxide provided it did not affect the inherent character of the compound. The preparation of substituted imidazoline is well known and requires no discussion. The oxyalkylation of substituted imidazolines is well known. See, for example, U. S. Patent No. 2,211,011, dated August 13, 1940, to Chwala, and U. S. Patent No. 2,468,180, dated April 26, 1949, to De Groote and Keiser. It is to be noted that the above patents are concerned with oxyalkylation broadly and are not limited to oxyalkylation, and to the extent that oxypropylation is employed the degree is modest and not within the description or characterization of excessive oxypropylation as herein included as part of the invention.

What has been said in the preceding paragraph may be explained further in the following manner. If a water-soluble substance, such as water itself, is treated with ethylene oxide the resultant or mixture of compounds so obtained continues to be water-soluble to a high molecular weight range, for instance, 2,000. If, on the other hand, propylene oxide is used instead of ethylene oxide, then and in that event when approximately 12 moles or more of propylene oxide are introduced per hydrophile unit water-insolubility results. For example, compare the water-insolubility of polypropylene glycol having twice this molecular weight. As far as I am aware there is no previous reference to highly oxypropylated substituted imidazolines, i. e., the introduction of at least 12 and preferably more than 12 moles of propylene oxide per substituted imidazoline molecule.

The amount of propylene oxide used need not be limited to being just moderately in excess of 12 moles of propylene oxide per imidazoline molecule. In a general way, I prefer to use approximately 6 to 10 moles of propylene oxide per nitrogen atom in the original polyalkylene amine and, more specifically, the polyethylene amine employed as a reactant. In such instances where the substituted imidazoline is derived from a hydroxylated fatty derivative as described elsewhere, even larger amounts of propylene oxide are not only acceptable but may even be desirable.

Having obtained the oxypropylated substituted imidazoline hereinafter described in detail, the next step is esterification involving a polycarboxy acid, and preferably a dicarboxy acid or reactant, in such molal ratio as to insure the presence of esterified carboxyl radicals. As a matter of fact, I have found it preferable to use at least one mole of the polycarboxy reactant for each hydroxyl radical present, but not necessarily limited as stated elsewhere.

For convenience, what is said hereinafter will be divided into five parts:

Part 1 is concerned with the selection or preparation of the substituted imidazoline;

Part 2 is concerned with the oxypropylation of the imidazoline as described in Part 1 preceding;

Part 3 is concerned with the formation of the acidic ester from the oxypropylated imidazoline described in Part 2, preceding;

Part 4 is concerned with the nature of the oxypropylated derivatives insofar that a cogeneric mixture is invariably obtained; and Part 5 is concerned with the process for breaking oil field emulsions, or similar emulsions, by means of the acidic esters as described in Part 3, preceding.

PART 1

For purpose of convenience reference is made again to Reissue Patent No. 23,227, reissued May 9, 1950, to Blair and Gross. Much of what is said herein appears in verbatim form in the text of said reissue patent. From a practical standpoint it is most satisfactory to use the cheapest commercially available reactants. In a general way this means fatty acids, such as the higher saturated or unsaturated fatty acids, such as oleic acid or its glyceride, ricinoleic acid or its glyceride castor oil, linseed oil, soyabean oil, naphthenic acids of various molecular weights varying from 200 to 250 up to approximately 400, abietic acid, tall oil representing a mixture of resin aicds and unsaturated fatty acids, etc. The mixed fatty acids obtained from the saponification of linseed oil are particularly suitable. The polyamines most readily available are polyethylene amines having 2 to 6, 7 or 8 nitrogen atoms. My preferred polyamines contain 3, 4 or 5 nitrogen atoms. Propylene oxide, of course, is readily available.

Oxypropylation is most readily accomplished by virtue of labile hydrogen atoms as part of the imidazoline ring. This means the presence of one or more hydrogen atoms attached to nitrogen or attached to oxygen, or both. However, it is possible to prepare an oxypropylated derivative from an imidazoline in which there is no labile hydrogen atom present as part of the imidazoline radical. For instance, if one prepares a compound of the following formula:

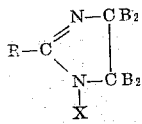

in which both R and X represent high molal groups, then obviously oxypropylation must involve the group R, assuming that X is not susceptible to oxypropylation, and B is selected from the class consisting of hydrogen atoms and methyl groups, with the proviso that the methyl group occurs not more than once. One can prepare aromatic fatty acids from materials such as phenol and an unsaturated acid such as oleic acid by means of aluminum chloride or sulfuric acid. If sulfuric acid is employed the compound can be desulfonated. In any event, one obtains a modified fatty acid which contains a reactive hydrogen atom, to wit, one attached to the phenolic radical. Similarly, hydroxylated fatty acids, such as ricinoleic acid, hydroxyacetic acid, etc., can be oxypropylated, provided the reaction cannot take place preferentially at some other point in the molecule as, for example, even an ester linkage. Thus, such compound or compounds resulting from the introduction of a hydroxyethyl group provides a modified detergent-forming acid or its obvious equivalent which, for the herein described purpose, is just as satisfactory as the unmodified fatty acid or equivalent. Similar changes can be made in resin acids and naphthenic acids. However, there is no justification for selecting such expensive reactant and apparently no added benefit is obtained. For this reason I prefer to use a polyamine as a reactant in which the substituted imidazoline contains a plurality of reactive hydrogen atoms. In any event, the substituted imidazoline must be oxyproplyation-susceptible or it is not contemplated as a reactant for the instant purpose.

Compounds which I have found to be effective for the purpose described belong to the general class of cyclic amidines, and in particular are substituted imidazolines, in which the imidazoline molecule contains at least one aliphatic, or cyloaliphatic hydrocarbon group containing from 8 to 32 carbon atoms. Cyclic imidazolines in which the 2-carbon atom is substituted by a long chain aliphatic hydrocarbon group are particularly easy to prepare and are very effective for the present use.

Shown in the most general way, as far as the 5-membered ring derivatives are concerned, the compounds contemplated for use in oxypropylation herein may be represented by the following formula:

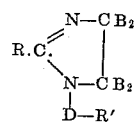

where at least one of the groups R and R' is an aliphatic or cycloaliphatic hydrocarbon group containing from 8 to 32 carbon atoms and otherwise may be hydrogen or a hydrocarbon radical; D is a divalent organic radical, and B is selected from the class consisting of hydrogen atoms and methyl groups, with the proviso that the methyl group occurs not more than once. In the more common reagents, D will be a relatively small organic radical, such as in the following examples of the grouping D—R':

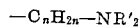

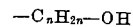

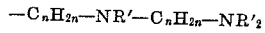

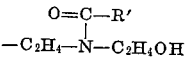

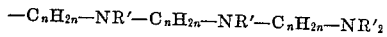

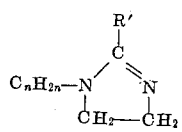

where $n$ is the numeral 1 to 6 and R' is hydrogen or an aliphatic or cycloaliphatic hydrocarbon radical.

In the simplest case, the group R' may be directly attached to the 1-nitrogen atom of the ring, as follows:

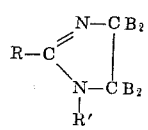

I have found that particularly outstanding demulsifiers result when the parent imidazoline compound contains basic nitrogen groups in addition to those inherently present in the imidazoline ring. In general, compounds of this type which are effective are those in which the basic nitrogen group is contained in the radical D in the above formula.

In this case the products may be represented by the formula:

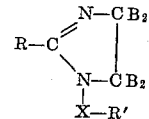

where R and R' are hydrogen or a hydrocarbon radical, and in which at least one of the groups R and R' is an aliphatic or cycloaliphatic hydrocarbon group containing from 8 to 32 carbon atoms; Y is a divalent organic radical containing amino groups, and B is selected from the class consisting of hydrogen atoms and methyl groups, with the proviso that the methyl group occurs not more than once. The group R' may be, and usually is, an amino nitrogen substituent. Examples of organic radicals which Y—R' may represent are:

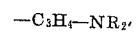

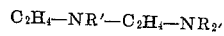

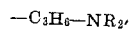

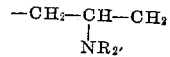

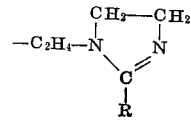

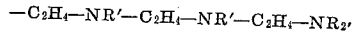

where R' and R have their previous significance.

Of this class of reagents in which an amino group occurs as a portion of the 1-nitrogen substituent, those which are derived, at least theoretically, from the polyethylene polyamines appear to be particularly effective as demulsifiers and are so outstanding as to constitute an invention within an invention. These have the general formula:

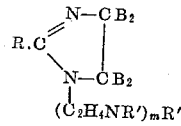

where R and R' have their previous meanings, $m$ is a small number, usually less than 6, and B is selected from the class consisting of hydrogen atoms and methyl groups, with the proviso that the methyl group occurs not more then once.

The preparation of an imidazoline substituted in the 2-position by aliphatic hydrocarbon radicals is well described in the literature and is readily carried out by reaction between a mono-carboxylic acid and a diamine, or polyamine, containing at least one primary amino group, and at least one secondary amino group, or another primary amino group separated from the first primary amino group by two carbon atoms. Examples of suitable polyamines which can be employed for this conventional imidazoline synthesis include ethylenediamine, diethylenetriamine, triethylenetetramine, tetraethylenepentamine, 1,2-diaminopropane, N-ethyl-ethylenediamine, N,N-dibutyldiethylenetriamine, 1,2-diaminobutane, hydroxyethylethylenediamine, dipropylenetriamine and the like. For details of the preparation of these reagents see the following U. S. Patents: U. S. No. 1,999,989, dated April 30, 1935, Max Bockmuhl et al.; U. S. No. 2,155,877, dated April 25, 1939, Edmund Waldmann et al.; and U. S. No. 2,155,878, dated April 25, 1939, Edmund Waldmann et al. Also see Chem. Rev., 32, 47 (43).

Attention is directed to the fact that the hydrocarbon radical separating the nitrogen atoms may have as many as 4 carbon atoms, or more, provided that the chain is branched and the actual number of carbon atoms between the nitrogen atoms is not more than 3. This is illustrated by secondary butylene diamine, di-secondary butylene triamine, tri-secondary butylene tetramine, etc. The structural formul of di-secondary butylene triamine is as follows:

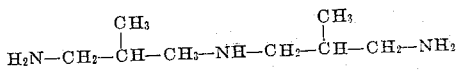

When an aliphatic or cycloaliphatic carboxylic acid containing 9 or more carbon atoms is employed in the above described synthesis, the resulting imidazoline will contain a 2-substituent consisting of an aliphatic hydrocarbon radical containing 8 or more carbon atoms. Suitable demulsifiers may, therefore, be made directly by reaction of acids such as oleic acid, linoleic acid, linolenic acid, erucic acid, talloil fatty acids, naphthenic acids, nonoic acid, and the like, with suitable amines such as those enumerated above. When this condensation is carried out at a temperature of 250° C. or higher, between equal mole proportions of mono-carboxylic acid and polyamine, two moles of water are evolved and the desired imidazoline is formed in almost quantitative yield. Such suitable reagents may be represented by the following formula:

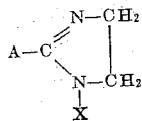

where X may be ethylene amino radicals, aminoalkyl radicals, or another imidazoline group, and where A is an aliphatic or cycloaliphatic hydrocarbon radical having from 8 to 32 carbon atoms. In the above formulas for imidazolines it should be pointed out that where X is a hydrogen atom, the nitrogen atoms become equivalent, insofar as reaction is concerned, and cannot be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application, the nitrogen atom to which the radical X is attached will be called the 1-nitrogen atom of the imidazoline ring. This is in conformance with the usual chemical convention in numbering heterocyclic ring positions.

Examples of suitable substituted imidazolines in which the aliphatic or cycloaliphatic group containing from 8 to 32 carbon atoms on either the one- or 2-position substituent, are exemplified as follows:

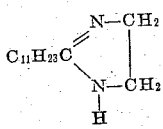

2-undecylimidazoline

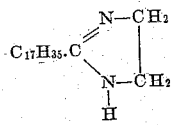

2-heptadecylimidazoline

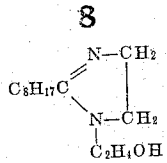

2-octyl, 1-hydroxyethylimidazoline

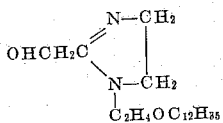

1-dodecyloxyethyl, 2-hydroxymethyl imidazoline

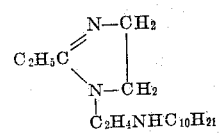

1 N-decylaminoethyl, 2-ethylimidazoline

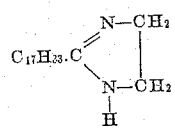

2-oleylimidazoline

I have pointed out above that imidazolines containing basic nitrogen groups, in addition to those occurring in the imidazoline ring are particularly effective demulsifiers. Such products are readily prepared from the commercially available polyethylene polyamines, or from polyamines in which there are three or more amino groups and in which there is at least one primary amino group separated by two carbon atoms from a secondary or primary amino group. Examples of suitable preferred compounds of this type are the following:

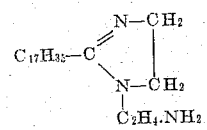

2 heptadecyl, 1-aminoethylimidazoline

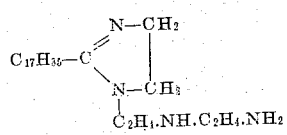

2 heptadecyl, 1-diethylenediaminoimidazoline

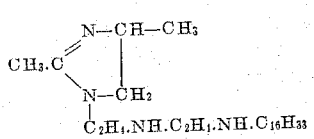

4,2-di-methyl, 1-hexadecylaminoethylaminoethylimidazoline

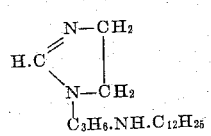

1-dodecylaminopropylimidazoline

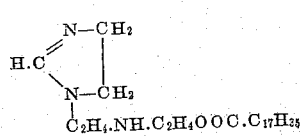

1-stearoyloxyethylaminoethylimidazoline

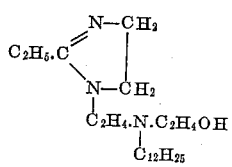

2-ethyl, 1-(N,N dodecyl, hydroxyethyl)aminoethylimidazoline

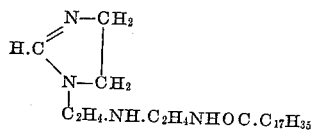

1-stearamidoethylaminoethylimidazoline

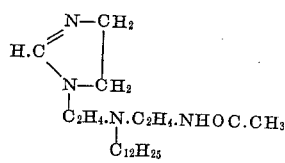

1-(N-dodecyl)-acetamidoethylaminoethylimidazoline

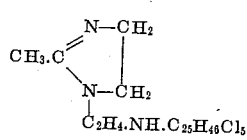

Chloroparaffin alkylation product of 1-aminoethyl, 2-methyl-imidazoline

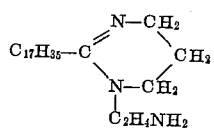

2-heptadecyl, 1-aminoethyl tetrahydropyrimidine

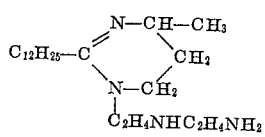

4-methyl,2-dodecyl,1-aminoethylaminoethyl tetrahydropyrimidine

It is unnecessary to point out that when polyamines have 4 or more nitrogen atoms one can prepare a compound having 2 imidazoline rings. This may be illustrated by a compound of the following formula:

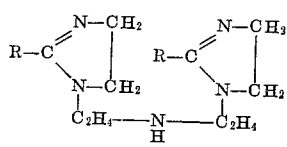

Such compounds can be derived, of course, from triethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

I have found no advantage in preparing such compounds containing 2 imidazoline rings and, as a matter of fact, prefer to prepare the simpler compounds having only one imidazoline ring. However, it is possible that in the preparation of compounds herein described intended to have only one imidazoline ring there is some of the compound formed having 2 such rings. It is understood, however, that a compound having 2 such rings is the obvious chemical equivalent of the simple compound and is herein contemplated as part of the present invention.

Such diimidazolines are intended to be included when reference is made to substituted imidazolines herein or in the claims.

PART 2

Previous reference has been made to the formation of an ester by reaction between a polycarboxy reactant and the products obtained by oxypropylation. Actually, this is an over-simplification for reasons which are obvious on closer examination. If, for example, one employs a tetramine, pentamine, hexamine, or the like, and reacts with a high molal monocarboxy acid to form a substituted imidazoline, the resultant product may have as a residue 1, 2, 3 or more amino hydrogen atoms which are susceptible to oxypropylation. It is entirely satisfactory and preferred that oxypropylation be so conducted that all amino hydrogen atoms react with propylene oxide. This may not be possible. The reason for this statement is that the oxypropylation is comparable to the oxypropylation of the parent body, i. e., the polyamine. Examination of oxypropylated polyamines, for instance, tetraethylene pentamine, suggests that there is no uniform propylation at all points of reaction throughout the procedure regardless of the conditions of oxypropylation. There is every reason to believe that in the case of comparable compounds, i. e., the substituted imidazolines herein employed as raw materials, the same situation prevails. This has an obvious significance insofar that one cannot predict with certainty whether or not, if there be any residual non-oxypropylated amino group present, such group in turn would be reactive towards the polycarboxy reactant to form an amide. Evidence seems to be that in some instances amides are formed but not necessarily in all instances where non-oxypropylated amino groups are present. For this reason where previous reference has been made to an ester it is true that an ester group is invariably present due to the decrease in the hydroxyl number after esterification but one cannot rule out the possibility of the formation of amides under appropriate circumstances where the reactants permit such formation.

Over and above this another factor must be considered and that is this. The substituted imidazoline ring invariably contains one broadly basic nitrogen atom. The oxypropylated nitrogen groups also may be fairly basic, at least modestly so. For this reason when a polycarboxy reactant is employed within the range previously specified and in the manner described in greater detail in Part 3 immediately succeeding there is the distinct possibility that a salt-like structure may be set up involving any free hydroxyl radical. The salt-like structure may involve a multiplicity of molecules or a single molecule. No data are available in regard to this particular point although it has been subjected to careful examination. It is to be noted, however, that nothing that is said herein, in the slightest way detracts from the ability to produce the described reactants without any difficulty whatsoever and such reactants, notwithstanding certain minor variations which are possible, are all uniformly satisfactory for the herein described purpose. It is to be noted also that this does not detract in any way from the ability to point out this invention with specificity.

Amplifying what has been said previously it may be worthwhile to consider what happens in the case of the oxypropylation of higher polyamines because the structural elements are similar for reasons specified. As stated, there is evidence that all the available hydrogen atoms are not necessarily attacked, at least under modest oxypropylation conditions and particularly when oxypropylation proceeds at comparatively low temperatures as herein described, for example, somewhere between the boiling point of water and 125° C. In the case of diethylene triamine there is some evidence that one terminal hydrogen atom only in each of the end groups is first attacked by propylene oxide and then the hydrogen atom attached to the nitrogen atom is attacked. It is quite possible that three long propylene oxide chains are built up before the two remaining hydrogens are attacked and perhaps not attacked at all. This, of course, depends on the conditions of oxypropylation. However, analytical procedure is not entirely satisfactory in some instances in differentiating between a reactive hydrogen atom attached to nitrogen and a reactive hydrogen atom attached to oxygen.

In the case of triethylenetetramine the same situation seems to follow. One hydrogen atom on the two terminal groups is first attacked and then the two hydrogen atoms on the two intermediate nitrogen atoms. Thus, four chains tend to build up and perhaps finally, if at all, the remaining two hydrogen atoms attached to the two terminal groups are attacked. In the case of tetraethylenepentamine the same approach seems to hold. One hydrogen atom on each of the terminal groups is attacked first, then the three hydrogen atoms attached to the three intermediate nitrogen atoms, and then finally, if at all, depending on conditions of oxypropylation, the two remaining terminal hydrogen atoms are attacked.

If this is the case it is purely a matter of speculation at the moment because apparently there is no data which determines the matter completely under all conditions of manufacture, and one has a situation somewhat comparable to the acylation of monoethanolamine or diethanolamine, i. e., acylation can take place involving either the hydrogen atom attached to oxygen or the hydrogen atom attached to nitrogen.

Oxypropylation of the nitrogen compounds to produce intermediates used for the production of the products used in accordance with the present invention is carried out in the usual type of equipment for oxyalkylations and by the procedures commonly used for the oxyalkylation of compositions having labile hydrogen atoms. For a discussion of the factors involved see, for example, United States Patent 2,679,513, Part 1 in columns 6, 7, 8, 9 and 10. This procedure will be illustrated by Examples 1a through 24a herein.

It is to be noted that in the present instance one has basic nitrogen atoms present. These basic nitrogen atoms will themselves catalyze the oxypropylation reaction for at least a little while. For this reason the use of an alkaline catalyst may be omitted in the beginning.

However, it is obvious that as oxypropylation proceeds the nitrogen atoms will decrease in basicity and the reaction must slow down. Then it becomes necessary to add an alkaline catalyst, such as caustic potash or caustic soda, to continue the reaction. However, there is no apparent advantage to delaying the addition of the alkaline catalyst. For this reason I prefer to add an alkaline catalyst at the very beginning and continue the reaction through without a break. In most instances 1% to 5% catalyst by weight of imidazoline will suffice.

As mentioned elsewhere the imidazolines range from water-dispersible to oil-soluble, i. e., kerosene- or xylene-soluble, as oxypropylation proceeds. As a matter of fact, I have found it preferable to employ those oxypropylation products which are oil-soluble, that is, the bulk of whose cogeneric mixtures are oil-soluble. These oil-soluble oxypropylation derivatives are represented, broadly speaking, by those imidazoline products having 20 or more moles of propylene oxide per mole of imidazoline product.

Example 1a

The particular autoclave used was one with a capacity of approximately 15 gallons or on the average of about 125 pounds of reaction mass. The speed of the stirrer could be varied from 150 to 350 R. P. M. The initial charge was 66.9 pounds of a castor oil triethylenetetramine imidazoline product taken from a batch made by reacting 53.5 parts of castor oil with 24.1 parts of triethylenetetramine. 1.33 pounds of caustic were added as a catalyst. The reaction pot was flushed out with nitrogen, the autoclave sealed, and the automatic devices adjusted and set for injecting 48.7 pounds of propylene oxide in a 10-hour period. The pressure regulator was set for a maximum of 35–37 pounds per square inch. However, in this particular step and in all succeeding steps the pressure never got over about 32 pounds per square inch. In fact, this meant that the bulk of the reaction could take place and did take place at an appreciably lower pressure. This comparatively low pressure was the result of the fact that the reactant per se was basic. The propylene oxide was added at a rate of about 10 pounds per hour and at a comparatively moderate temperature, to wit, about 250°–255° F. (moderately higher than the boiling point of water). The initial introduction of propylene oxide did not start until the heating devices had raised the temperature to 245° F. At the completion of the reaction a sample was taken and oxypropylation proceeded as in Example 2a immediately following.

Example 2a 82.03 pounds of the reaction mass identified as Example 1a, preceding, and equivalent to 46.9 pounds of imidazoline and 0.93 pound of catalyst and 34.2 pounds of propylene oxide were subjected to oxyalkylation with 24.4 pounds of propylene oxide.

The oxypropylation was conducted in substantially the same manner in regard to temperature and pressure as in Example 1a, preceding. Due to the smaller amount of propylene oxide introduced the time period was much shorter, to wit, 3 hours. The rate of oxide introduction was about 15 to 16 pounds per hour. At the end of the reaction period part of the sample was withdrawn and oxypropylation continued as in Example 3a, immediately following.

Example 3a 81.43 pounds of the reaction mass identified as Example 2a, preceding, and equivalent to 35.8 pounds of imidazoline, 44.8 pounds of propylene oxide, and 0.71 pound of catalyst, were permitted to stay in the autoclave. 20.4 pounds of propylene oxide were introduced in a 5-hour period. No additional catalyst was added.

The conditions of reaction as far as temperature and pressure were concerned were substantially the same as in Example 1a, preceding. The propylene oxide was added at the rate of about 5½ pounds per hour. At the completion of the reaction part of the reaction mass was withdrawn and the remainder subjected to further oxypropylation as described in Example 4a, immediately following.

Example 4a 76.83 pounds of the reaction mass identified as Example 3a, preceding, and equivalent to 27.1 pounds of imidazoline, 49.4 pounds of propylene oxide, and 0.54 pound of catalyst were permitted to stay in the autoclave. No additional catalyst was added.

The conditions in regard to temperature and pressure were substantially the same as in Example 1a, preceding. In this instance the oxide was added in 7 hours. The amount of oxide added was 21 pounds. The addition was at the rate of about 7 pounds per hour.

What has been said herein is presented in tabular form in Table 1 immediately following with some added information as to theoretical molecular weight, hydroxyl number, etc. Also, other examples have been presented in this table as it is not necessary to cite them all in detail as has been done with the preceding examples.

TABLE 1

| Ex. No. | Composition Before | | | Composition After | | | Theo. Mol. Wt. | OH Value | Max. Temp., °F. | Max. pres., p. s. i. g. | Time, Hrs. |
|---|---|---|---|---|---|---|---|---|---|---|---|
| | Imidazo., lbs. | Oxide, lbs. | Catalyst, lbs. | Imidazo., lbs. | Oxide, lbs. | Catalyst, lbs. | | | | | |
| (1) | | | | | | | | | | | |
| 1a | 66.9 | | 1.33 | 66.9 | 48.7 | 1.33 | 1,924 | 320 | 250-255 | 35-37 | 10 |
| 2a | 46.9 | 34.2 | 0.93 | 46.9 | 58.6 | 0.93 | 2,504 | 260 | 250-255 | 35-37 | 3 |
| 3a | 35.8 | 44.8 | 0.71 | 35.8 | 65.2 | 0.71 | 3,150 | 196 | 250-255 | 35-37 | 5 |
| 4a | 27.1 | 49.4 | 0.54 | 27.1 | 70.9 | 0.54 | 4,012 | 142 | 250-255 | 35-37 | 7 |
| (2) | | | | | | | | | | | |
| 5a | 35.0 | | 0.70 | 35.0 | 76.0 | 0.70 | 1,186 | 125 | 250-255 | 35-37 | 14 |
| 6a | 22.0 | 47.7 | 0.40 | 22.0 | 81.8 | 0.40 | 1,766 | 90 | 250-255 | 35-37 | 6 |
| 7a | 16.9 | 62.7 | 0.30 | 16.9 | 91.5 | 0.30 | 2,406 | 83 | 250-255 | 35-37 | 6 |
| 8a | 12.5 | 67.5 | 0.22 | 12.5 | 96.6 | 0.22 | 3,274 | 75 | 250-255 | 35-37 | 7 |
| (3) | | | | | | | | | | | |
| 9a | 35.0 | | 0.70 | 35.0 | 86.90 | 0.70 | 1,139 | 101 | 250-255 | 35-37 | 13 |
| 10a | 22.82 | 56.60 | 0.46 | 22.82 | 97.10 | 0.46 | 1,719 | 84 | 250-255 | 35-37 | 7 |
| 11a | 15.19 | 64.50 | 0.31 | 15.19 | 94.10 | 0.31 | 2,359 | 77 | 250-255 | 35-37 | 5 |
| 12a | 11.10 | 68.80 | 0.23 | 11.10 | 98.35 | 0.23 | 3,227 | 74 | 250-255 | 35-37 | 5.5 |
| (4) | | | | | | | | | | | |
| 13a | 30.00 | | 0.60 | 30.00 | 80.00 | 0.60 | 1,116 | 136 | 250-255 | 35-37 | 13 |
| 14a | 21.73 | 57.90 | 0.43 | 21.73 | 99.35 | 0.43 | 1,696 | 118 | 250-255 | 35-37 | 6 |
| 15a | 14.30 | 65.40 | 0.28 | 14.30 | 95.40 | 0.28 | 2,336 | 104 | 250-255 | 35-37 | 4 |
| 16a | 10.40 | 69.35 | 0.20 | 10.40 | 99.15 | 0.20 | 3,204 | 96 | 250-255 | 35-37 | 4 |
| (5) | | | | | | | | | | | |
| 17a | 50.00 | | 1.00 | 50.00 | 70.55 | 1.00 | 1,387 | 90 | 250-255 | 35-37 | 11 |
| 18a | 26.78 | 37.78 | 0.54 | 26.78 | 64.78 | 0.54 | 1,967 | 68 | 250-255 | 35-37 | 8 |
| 19a | 21.80 | 52.70 | 0.44 | 21.80 | 76.90 | 0.99 | 2,607 | 55 | 250-255 | 35-37 | 7 |
| 20a | 16.50 | 58.10 | 0.33 | 16.50 | 83.00 | 0.33 | 3,475 | 49 | 250-255 | 35-37 | 8 |
| (6) | | | | | | | | | | | |
| 21a | 35.0 | | 0.70 | 35.0 | 88.80 | 0.70 | 1,132 | 110 | 250-255 | 35-37 | 14 |
| 22a | 22.50 | 57.05 | 0.45 | 22.50 | 101.85 | 0.45 | 1,712 | 83 | 250-255 | 35-37 | 9 |
| 23a | 14.42 | 65.20 | 0.29 | 14.42 | 91.38 | 0.29 | 2,352 | 75 | 250-255 | 35-37 | 5 |
| 24a | 10.88 | 68.80 | 0.22 | 10.88 | 98.40 | 0.22 | 3,220 | 61 | 250-255 | 35-37 | 7 |

[1] Imidazoline product derived from castor oil and triethylenetetramine.
[2] Imidazoline product derived from talloil and triethylenetetramine.
[3] Imidazoline product derived from talloil and diethylenetriamine.
[4] Imidazoline product derived from oleic acid and diethylenetriamine.
[5] Imidazoline product derived from ricinoleic acid and Duomeen T. (Duomeen T is a product of approximately the following formula: RNH—$CH_2CH_2CH_2NH_2$, where R consists of $C_{16}$ and $C_{18}$ hydrocarbon chains. Note that this imidazoline will be oxyalkylation-susceptible only in the radical on the 2-carbon position, i. e., the ricinoleic radical. This information is according to the manufacturer, Armour Chemical Company.)
[6] Imidazoline product derived from oleic acid and trimethylenediamine. Note that this will produce a 6-membered imidazoline ring.

The product at the end of the oxypropylation step, was a somewhat viscous amber to dark-reddish colored fluid. In general the color gradually lightens as oxypropylation proceeds. The hydroxyl values mentioned in the above table immediately preceding were determined by the standard Verley-Bolsing method. This value is sometimes referred to as acetyl value and is a well known determination in the art. It is to be noted that there is no complete conversion of propylene oxide into the desired hydroxylated compounds. This is indicated by the fact that the theoretical molecular weight based on a statistical average is greater than the molecular weight when calculated on the basis of acetyl or hydroxyl value. Actually, there is no completely satisfactory method for determining the molecular weights of these types of compounds with a high degree of accuracy. In some instances the acetyl value or hydroxyl value serves as satisfactorily as an index to the molecular weight as any other procedure due to the above limitations, and especially in the higher molecular weight range. If any difficulty is encountered in the manufacture of the esters as described in Part 3, succeeding, a stoichiometrical amount of acid or acid compound should be taken which corresponds to the indicated acetyl or hydroxyl value. This matter has been discussed in the literature and is a matter of common knowledge and requires no further elaboration.

In the above table the time factors mentioned are generally longer than would ordinarily be required. Needless to say, the oxypropylation rate can be speeded by increasing the agitation or the temperature and by a choice of suitable reaction vessels. However, as it is sometimes desirable to allow the reaction mass to stir for as long as a half-hour to one hour before drawing a sample after the addition of propylene oxide has stopped, these time factors are not considered excessive. I have chosen them at my own preference and they can be varied moderately one way or the other, depending on one's inclination.

PART 3

As pointed out previously the present invention is concerned with compounds or derivatives involving ester linkages obtained from the oxypropylated derivatives described in Part 2 immediately preceding, and polycarboxy acids, particularly tricarboxy acids like citric acid and dicarboxy acids such as adipic acid, phthalic acid, or anhydride, succinic acid, diglycolic acid, sebacic acid, azelaic acid, aconitic acid, maleic acid or anhydride, citraconic acid or anhydride, maleic acid or anhydride adducts as obtained by the Diels-Alder reaction from products such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and polyols or other hydroxylated compounds is well known. In this case the hydroxylated compounds obtained as described in Part 2, preceding, contain nitrogen atoms which are apt to be basic. Thus, as has been explained previously, it is probable, particularly where there is a basic nitrogen atom present, that salts may be formed but in any event under the conditions described it is improbable, in fact almost impossible, for the reaction to take place without the formation of ester linkages. It has been pointed out, also, that under some of the circumstances at least, amidification may enter into the reaction. Over and above this is the fact that the radical previously indicated as R, i. e., the radical attached to the 2-position carbon atom of the ring, may include in its structure a hydroxyl group as in such instances where it is derived from ricinoleic acid, hydroxystearic acid, etc. Thus, it becomes obvious that even if a dicarboxy acid or anhydride is employed there may be present 3 or more points of reaction in the other material employed in the esterification reaction, i. e., the oxypropylated derivative. For this reason there is also the possibility, unless appropriate precautions are taken, that insoluble resins or gelatinous materials will be formed. I have found that this can be avoided by adding sufficient low molal sulfonic acid, such as paratoluene sulfonic acid, or even hydrochloric acid, to neutralize the basicity prior to esterification. The addition of such acid catalyst, of course, serves another purpose—to eliminate any basic catalyst which was left from the oxypropylation procedure. Needless to say, addition of the strong acid provides the conventional role of esterification catalyst which is desirable in the instant case although not absolutely essential in such case. The same situation has been noted in comparable reactions, for instance, esterification of triethanolamine or polymerized derivatives of triethanolamine. It means, perhaps, that in the instant case the compounds employed in the process for breaking petroleum emulsions contain in part the salt form of hydrochloric acid or paratoluene sulfonic acid, or whatever acid may be employed in this particular procedure. In any event, this is merely a matter of detail and such procedures are well known in comparable processes and do not affect the step herein referred to as the esterification procedure, although, as pointed out, in at least a number of instances it is more complicated than simple esterification.

Needless to say, various compounds of the polycarboxy acids may be used instead of the free acid, such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange heat-oxypropylated compounds, and particularly likely to do so if the esterification temperature is too high. Generally, care is taken to add just a very slight excess of acid for the actual esterification. The use of hydrochloric acid gas has one advantage over paratoluene sulfonic acid and that is that at the end of the reaction it can be mostly removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself.

The products obtained in Part 2 preceding almost always contain a basic catalyst. As a general procedure I have added an amount of half-concentrated hydrochloric acid considerably in excess of what is required to neutralize the residual catalyst. The mixture is shaken thoroughly with xylene and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. Ordinarily this refluxing temperature is apt to be in the neighborhood of 160° C. to possibly 190° C. All such procedures are conventional and have been so thoroughly described in the literature that further consideration will be limited to a few examples and a comprehensive table.

The above mentioned petroleum solvents are sold by various oil refineries and, as far as solvent effect, act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

The addition of such high-boiling solvent or solvents in conjunction with xylene provides a very flexible system for controlling the esterification temperature. Obviously, the more xylene present the lower will be the refluxing temperature and, conversely, the more high boiling solvent present the higher will be the refluxing temperature. Normally, I prefer to start refluxing at as low a temperature as possible, i. e., with much xylene present, but if the esterification reaction does not seem to be proceeding satisfactorily then I merely withdraw more and more solvent mixture from the reflux trap thereby raising the temperature. As mentioned, by using this method the esterification temperature can be ranged easily from 160° to possibly 190° C. My preference is not to go over 200° C. under any circumstances.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

When esterification is complete, it is then sometimes necessary to adjust the final solvent-compound solution so as to produce a clear bright product. In a number of examples, either xylene-methanol was satisfactory, or xylene alone was satisfactory. This is the case particularly in the instance of higher oxypropylations where the product showed comparatively limited water-solubility, although it sometimes happened that even there it was desirable to mix in a semi-polar solvent with xylene, for example, to give a homogeneous system. Note, for example, that xylene was reasonably satisfactory in Examples 13b through 16b, although even here there was some tendency towards turbidity and for this reason it may have been better to have used the xylene-methanol mixture as was done in the preceding examples. In those examples where the mixed solvent was used approximately two-thirds of the solvent by weight was xylene and one-third by weight was methanol. Xylene was used first by itself. When all the water had been eliminated methanol equal to one-half the xylene or one-third the subsequent mixture, was added so as to give a single phase system. Other instances have been shown that diethyleneglycol diethylether is just as satisfactory, or more satisfactory, than methanol, or a mixture of these two semi-polar solvents can be used.

Another obvious procedure, of course, is merely to distill off a solvent such as xylene or xylene-methanol and then dissolve the product in a semi-polar solvent, such as methanol, ethanol, propanol, etc. It is purely a matter of convenience to employ first a non-polar solvent (water-insoluble to eliminate the water during distillation) and then add a suitable polar solvent (hydrophile) to give a single-phase system.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous amber-to-dark-amber liquid so obtained may contain a small amount of sodium sulfate or sodium chloride but, in any event, is perfectly acceptable for esterification in the manner previously described.

TABLE 3

| Ex. No. of Acid Ester | Solvent | Amt. Solvent (grams) | Max. Esterification Temp., °C. | Time of Esterification (hrs.) | Water Out (cc.) |
|---|---|---|---|---|---|
| 1b | Xylene-Methanol | 248 | 150 | 4 | 15.5 |
| 2b | do | 276 | 165 | 4½ | |
| 3b* | do | 208 | 150 | 4 | 46.0 |
| 4b | do | 288 | 170 | 6 | 15.1 |
| 5b | do | 231 | 160 | 4 | 12.2 |
| 6b | do | 253 | 165 | 4 | |
| 7b | do | 202 | 160 | 4 | 32.5 |
| 8b | do | 262 | 170 | 6 | 12.4 |
| 9b | do | 211 | 170 | 5 | 9.5 |
| 10b | do | 230 | 170 | 5½ | |
| 11b | do | 185 | 170 | 4½ | 29.3 |
| 12b | do | 235 | 170 | 7 | 9.2 |
| 13b | Xylene | 194 | 170 | 6 | 6.9 |
| 14b | do | 206 | 170 | 8 | |
| 15b | do | 175 | 170 | 6½ | 20.8 |
| 16b | do | 211 | 170 | 8½ | 6.6 |

*Water of hydration present in oxalic acid.

The procedure for manufacturing the esters has been illustrated by preceding examples. If for any reason reaction does not take place in a manner that is acceptable, attention should be directed to the following details: (a) Recheck the hydroxyl or acetyl value of the oxypropylated derivative and use a stoichiometrically equivalent amount of acid; (b) if the reaction does not proceed with reasonable speed either raise the temperature indicated or else extend the period of time up to 12 or 16 hours if need be; (c) if necessary, increase the amount of acid catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

These acidic esters vary in color from amber to virtually a black solution, generally following close to the color of their parent oxypropylated derivative. Like the oxypropylated derivatives they are generally viscous and even tend to be somewhat more viscous than the parent compound. In fact, some of them verge on a state of being gelatinous or "rubbery," to which, as previously mentioned, the paratoluene sulfonic acid, or some similar acid, is added to prevent complete gelation. Those esters made from the more water-soluble and smaller molecular weight acids, i. e., oxalic and diglycolic, tend to be rather water-dispersible whereas those made from acids such as phthalic or aconitic tend to be more oil-soluble, i. e., kerosene or xylene-

TABLE 2

| Ex. No. of Acidic Ester | Ex. No. of Hydroxy Compound | Theo. Mol. Wt. | Hydroxyl Value | Amt. of Hydroxy Compound (grams) | Polycarboxy Reactant | Amt. of Polycarboxy Reactant (grams) |
|---|---|---|---|---|---|---|
| 1b | 1a | 1,924 | 320 | 150 | Diglycolic Acid | 114.2 |
| 2b | 1a | 1,924 | 320 | 150 | Phthalic Anhydride | 126.5 |
| 3b | 1a | 1,924 | 320 | 150 | Oxalic Acid | 104.1 |
| 4b | 1a | 1,924 | 320 | 150 | Aconitic Acid | 153.0 |
| 5b | 2a | 2,504 | 260 | 150 | Diglycolic Acid | 93.0 |
| 6b | 2a | 2,504 | 260 | 150 | Phthalic Anhydride | 102.9 |
| 7b | 2a | 2,504 | 260 | 150 | Oxalic Acid | 84.7 |
| 8b | 2a | 2,504 | 260 | 150 | Aconitic Acid | 124.1 |
| 9b | 3a | 3,150 | 196 | 150 | Diglycolic Acid | 70.5 |
| 10b | 3a | 3,150 | 196 | 150 | Phthalic Anhydride | 77.9 |
| 11b | 3a | 3,150 | 196 | 150 | Oxalic Acid | 64.2 |
| 12b | 3a | 3,150 | 196 | 150 | Aconitic Acid | 94.2 |
| 13b | 4a | 4,012 | 142 | 150 | Diglycolic Acid | 50.8 |
| 14b | 4a | 4,012 | 142 | 150 | Phthalic Anhydride | 56.2 |
| 15b | 4a | 4,012 | 142 | 150 | Oxalic Acid | 46.3 |
| 16b | 4a | 4,012 | 142 | 150 | Aconitic Acid | 68.0 | soluble although still considerably hydrophile in character as is shown in the tables. In almost all cases it is necessary to use a semi-polar or polar solvent, such as methanol, to take the esters into solution.

Even under the most carefully controlled conditions of oxypropylation involving comparatively low temperature and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to dark amber in color, and show moderate viscosity. They can be bleached with bleaching clays, filtering chars, and the like. However, for the purpose of demulsification or the like color is not a factor and decolorization is not justified.

PART 4

In the hereto appended claims the demulsifying agent is described as an ester obtained from a hydroxylated material prepared from an imidazoline. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxyalkylation particularly in any procedure which involves the introduction of repetitious ether linkages, i. e., excessive oxyalkylation, using, for example, ethylene oxide, propylene oxide, etc., runs into difficulties of at least two kinds; (a) formation of a cogeneric mixture rather than a single compound, and (b) excessive side reactions or the like. The former phase will be considered in the paragraphs following. As to the latter phase, see U. S. Patent No. 2,236,919 dated April 1, 1941, to Reynhart.

Oxypropylation involves the same sort of variations as appears in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol radical or the secondary alcohol radical. Actually, when such products are obtained, such as a high molal polypropylene glycol or the products obtained in the manner herein described one does not obtain a single derivative such as $HO(RO)_nH$ or $—(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The proportion of such mixture represents the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by the following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to U. S. Patent No. 2,549,434, dated April 17, 1951, to De Groote, Wirtel and Pettingill.

However, momentarily referring again to a monohydric initial reactant it is obvious that if one selects any such simple hydroxylated compound and subjects such compound to oxyalkylation, such as oxyethylation, or oxypropylation, it becomes apparent that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product described by the formula is best described also in terms of method of manufacture.

The significant fact in regard to the oxypropylated imidazoline products herein described is that in their initial state of oxypropylation they are substantially all water-soluble or water-dispersible. As oxypropylation proceeds the oil solubility increases and the water-solubility decreases. When one reaches, for instance, the molecular weight of 2000 to 3000 in the present case, for all practical purposes the compounds are oil-soluble, i. e., kerosene and, of course, xylene-soluble. However, in between if a sample of the product is shaken with water and allowed to stand varying percentages will not dissolve in water. As the ratio of propylene oxide to imidazoline product increases the ratio of oil-solubility to water-solubility increases. I consider such varying solubility factors to be all the more indicative of the fact that oxypropylation here produces cogeneric mixtures, some of which are completely oil-soluble and some of which are still water-soluble. The exact composition is open to question for reasons which are common to all oxyalkylations. It is interesting to note, however, that the molecular weights based on hydroxyl determination are almost always considerably less than the molecular weight based on theoretical consideration.

It becomes obvious when carboxylic acidic esters are prepared from such high molecular weight materials that the ultimate esterification product again must be a cogeneric mixture. Likewise, it is obvious that the contribution to the total molecular weight made by the polycarboxy acid is small. By the same token, one would expect the effectiveness of the demulsifier to be comparable to the unesterified hydroxylated material. Remarkably enough, in practically every instance the product is distinctly better, and in the majority much more effective.

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

Oxyalkylated derivative, for example, the product of Example 2b, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%:
A high-boiling aromatic petroleum solvent, 15%;
Isopropyl alcohol, 5%.

The above proportions are all weight percents.

Having thus described my invention, what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being obtained by reaction between (A) a polycarboxy acid, and (B) a highly oxypropylated substituted ring compound selected from the group consisting of

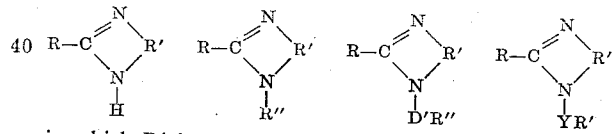

in which R' is a divalent alkylene radical selected from the class consisting of

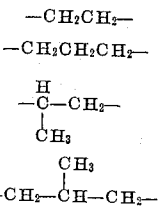

and in which D' represents a divalent, non-amino, organic radical containing less than 25 carbon atoms, composed of elements from the group consisting of C, H, O, and N; Y represents a divalent, organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R'' is a member of the class consisting of hydrogen, aliphatic radicals and cycloaliphatic radicals, with the proviso that in the occurrence of the radicals R and R'' there be present at least one group of 8 to 32 uninterrupted carbon atoms; and with the further proviso that (1) there be introduced at least 12 moles of propylene oxide per substituted nitrogen-containing ring compound, and that (2) there be employed at least one mole of the polycarboxy reactant for each reactive hydroxyl radical.

2. A process for breaking petroleum emulsions of the water-in-oil type characterized by subjecting the emulsion to the action of a demulsifier including synthetic hydrophile products; said synthetic hydrophile products being obtained by reaction between (A) a polycarboxy acid, and (B) a highly oxypropylated substituted imidazoline selected from the group consisting of

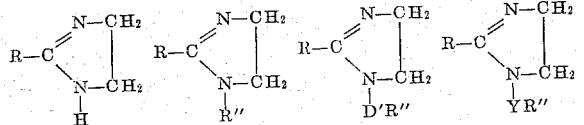

in which D' represents a divalent, non-amino, organic radical containing less than 25 carbon atoms, composed of elements from the group consisting of C, H, O, and N; Y represents a divalent, organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 moles of propylene oxide per substituted imidazoline molecule and that (2) there be employed at least one mole of the polycarboxy reactant for each reactive hydroxyl radical.

3. A process for breaking petroleum emulsions of the water-in-oil type characterized by subjecting the emulsion to the action of a demulsifier including synthetic hydrophile products, said synthetic hydrophile products being obtained by reaction between (A) a dicarboxy acid, and (B) a highly oxypropylated substituted imidazoline selected from the group consisting of

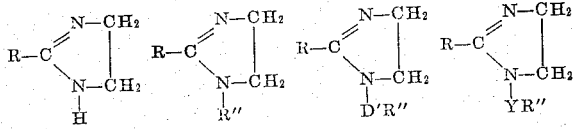

in which D' represents a divalent, non-amino, organic radical containing less than 25 carbon atoms, composed of elements from the group consisting of C, H, O, and N; Y represents a divalent, organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 moles of propylene oxide per substituted imidazoline molecule and that (2) there be employed at least one mole of the dicarboxy reactant for each reactive hydroxyl radical.

4. A process for breaking petroleum emulsions of the water-in-oil type characterized by subjecting the emulsion to the action of a demulsifier including synthetic hydrophile products, said synthetic hydrophile products being obtained by reaction between (A) a dicarboxy acid, and (B) a highly oxypropylated substituted imidazoline consisting of

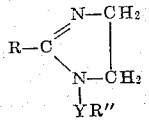

in which Y represents a divalent, organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 moles of propylene oxide per substituted imidazoline molecule, and that (2) there be employed at least one mole of the dicarboxy reactant for each reactive hydroxyl radical.

5. A process for breaking petroleum emulsions of the water-in-oil type characterized by subjecting the emulsion to the action of a demulsifier including synthetic hydrophile products, said synthetic hydrophile products being obtained by reaction between (A) a dicarboxy acid, and (B) a highly oxypropylated substituted imidazoline consisting of

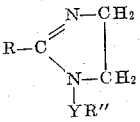

in which Y represents a divalent, organic radical containing less than 25 carbon atoms, composed of elements from the group consisting of C, H, O, and N, and containing at least one amino group, R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 molecules of propylene oxide per substituted imidazoline molecule; that (2) there be present a multiplicity of labile hydrogen atoms in the substituted imidazoline molecule; and that (3) there be employed at least one mole of the dicarboxy reactant for each reactive hydroxyl radical.

6. A process for breaking petroleum emulsions of the water-in-oil type characterized by subjecting the emulsion to the action of a demulsifier including synthetic hydrophile products, said synthetic hydrophile products being obtained by reaction between (A) a dicarboxy acid, and (B) a highly oxypropylated substituted imidazoline consisting of

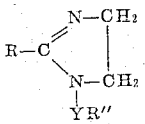

in which Y represents a divalent organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 molecules of propylene oxide per substituted imidazoline molecule; that (2) there be present a multiplicity of labile hydrogen atoms in the substituted imidazoline molecule; that (3) there be employed at least one mole of the dicarboxy reactant for each reactive hydroxyl radical; and that (4) there be present in the substituted imidazoline radical a plurality of hydroxyl radicals.

7. A process for breaking petroleum emulsions of the water-in-oil type characterized by subjecting the emulsion to the action of a demulsifier including synthetic hydrophile products, said synthetic hydrophile products being obtained by reaction between (A) a dicarboxy acid, and (B) a highly oxypropylated substituted imidazoline consisting of

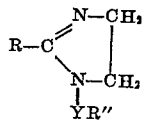

in which Y represents a divalent organic radical containing less than 25 carbon atoms, composed of elements from the group consisting of C, H, O, and N, and containing at least one amino group; R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" is a member of the class consisting of hydrogen, aliphatic radicals and cycloaliphatic radicals, with the proviso that in the occurrences of the radicals R and R" there be present at least one group of 8 to 32 uninterrupted carbon atoms; and with the further proviso that (1) there be introduced at least 12 molecules of propylene oxide per substituted imidazoline molecule; that (2) there be present a multiplicity of labile hydrogen atoms in the substituted imidazoline molecule; that (3) there be employed at least one mole of the dicarboxy reactant for each reactive hydroxyl radical; that (4) said oxypropylated substituted imidazoline prior to esterification be oil-soluble; and that (5) there be present in the substituted imidazoline radical a plurality of hydroxyl radicals.

8. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule.

9. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule, and with the proviso that the dicarboxy acid is diglycolic acid.

10. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule; with the proviso that the dicarboxy acid is diglycolic acid, and with the further proviso that the radical R attached directly to the 2-carbon atom is derived from ricinoleic acid.

11. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule; with the proviso that the dicarboxy acid is diglycolic acid, and with the further proviso that the radical R attached directly to the 2-carbon atom is derived from oleic acid.

12. The process of claim 7 wherein the radical Y is derived from polyethylene amine containing at least 3 nitrogen atoms, and the amount of propylene oxide employed is in excess of 14 and not over 60 molecules of propylene oxide per substituted imidazoline molecule; with the proviso that the dicarboxy acid is diglycolic acid, and with the further proviso that the radical R attached directly to the 2-carbon atom is derived from abietic acid.

13. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule; with the proviso that the dicarboxy acid is diglycolic acid, and with the further proviso that the radical R attached directly to the 2-carbon atom is derived from tall oil.

14. The process of claim 7 wherein the radical Y is derived from a polyethylene amine containing at least 3 nitrogen atoms, and the amount of propylene oxide employed is in excess of 14 and not over 60 molecules of propylene oxide per substituted imidazoline molecule; with the proviso that the dicarboxy acid is diglycolic acid, and with the further proviso that the radical R attached directly to the 2-carbon atom is derived from linseed oil fatty acids.

References Cited in the file of this patent

UNITED STATES PATENTS

| | | |
|---|---|---|
| 2,542,003 | De Groote et al. | Feb. 20, 1951 |
| 2,552,534 | De Groote | May 15, 1951 |